United States Patent
Watanabe et al.

(10) Patent No.: US 7,868,923 B2
(45) Date of Patent: Jan. 11, 2011

(54) IMAGING SYSTEM

(75) Inventors: Nobuyuki Watanabe, Yokohama (JP);
Tomoyuki Nakamura, Cambridge, MA (US); Takahiro Yano, Hachioji (JP)

(73) Assignee: Olympus Corporation, Tokyo (JP)

( * ) Notice: Subject to any disclaimer, the term of this patent is extended or adjusted under 35 U.S.C. 154(b) by 546 days.

(21) Appl. No.: 11/628,909

(22) PCT Filed: Jun. 9, 2005

(86) PCT No.: PCT/JP2005/011004

§ 371 (c)(1),
(2), (4) Date: Jan. 4, 2007

(87) PCT Pub. No.: WO2005/122554

PCT Pub. Date: Dec. 22, 2005

(65) Prior Publication Data

US 2007/0268388 A1    Nov. 22, 2007

(30) Foreign Application Priority Data

Jun. 10, 2004    (JP)    ............................. 2004-172094

(51) Int. Cl.
*H04N 5/228* (2006.01)
*H04N 5/335* (2006.01)
*H04N 5/14* (2006.01)
*G06K 9/32* (2006.01)

(52) U.S. Cl. .................... 348/222.1; 348/294; 348/699; 382/299

(58) Field of Classification Search ............. 348/222.1, 348/699, 294; 382/299
See application file for complete search history.

(56) References Cited

U.S. PATENT DOCUMENTS

| | | | | |
|---|---|---|---|---|
| 5,657,402 A | * | 8/1997 | Bender et al. | ................ 382/284 |
| 6,285,804 B1 | * | 9/2001 | Crinon et al. | ................ 382/299 |
| 6,330,344 B1 | * | 12/2001 | Kondo et al. | ................. 382/107 |
| 6,618,081 B1 | * | 9/2003 | Harada et al. | ............. 348/231.6 |
| 6,750,903 B1 | * | 6/2004 | Miyatake et al. | ......... 348/218.1 |
| 6,906,751 B1 | | 6/2005 | Norita et al. | |
| 7,352,919 B2 | * | 4/2008 | Zhou et al. | ................... 382/299 |
| 2003/0227552 A1 | | 12/2003 | Watanabe | |
| 2005/0141047 A1 | | 6/2005 | Watanabe | |

FOREIGN PATENT DOCUMENTS

JP    4-172778 A    6/1992

(Continued)

*Primary Examiner*—David L Ometz
*Assistant Examiner*—Quang V Le
(74) *Attorney, Agent, or Firm*—Holtz, Holtz, Goodman & Chick, PC (57) ABSTRACT

An optical system forms an optical image on an imager, and a read control block selects a read rule for the imager depending on a magnification addressed by a magnification address block. The imager transforms an optical image at an addressed area into electrical signals in compliance with the read rule. The read image signals are stored in n image memories, where n is the number of images necessary for ultra-resolution processing. Ultra-resolution processing is built up of a motion estimation block and a high-resolution image estimation block adapted to estimate image data having a high-resolution image sequence. A selector selects a basic image for motion estimation and an image that is estimated in terms of motion.

9 Claims, 11 Drawing Sheets

FOREIGN PATENT DOCUMENTS

| | | |
|---|---|---|
| JP | 4-196775 A | 7/1992 |
| JP | 7-131692 A | 5/1995 |
| JP | 2000-41186 A | 2/2000 |
| JP | 2002-112096 A | 4/2002 |
| JP | 2002-369083 A | 12/2002 |
| JP | 2003-338988 A | 11/2003 |

* cited by examiner

ODD

FIG. 2(b)

EVEN

IMAGING SYSTEM

This application is a U.S. National Phase Application under 35 USC 371 of International Application PCT/JP2005/011004 filed Jun. 9, 2005.

ART FIELD

The present invention relates to an imaging system adapted to make use of an image input means having a reduced number of pixels to generate a high-resolution image.

BACKGROUND ART

Various methods that make use of image data having a reduced number of pixels to generate high-resolution images have been proposed for use with imaging systems such as video cameras. As set forth typically in JP(A)10-69537, there is a method wherein an ultra-resolution technique is used with a low-resolution image comprising multiple frames having displacements to generate a high-resolution image. Ultra-resolution processing is a technique where two or more images having displacements at the sub-pixel level are taken, and they are then combined together into one single high-definition image after factors responsible for their deteriorations are canceled out.

By the way, there is an imaging system wherein, as is the case with a video camera, there is some limitation to the number of clocks per frame, and an imaging device has more pixels than an output image has. To implement effective ultra-resolution processing when such an image system is used, it is required that data be read out of only a part of the imaging device, and ultra-resolution processing be applied to that area alone. However, a change in the angle of view for implementing ultra-resolution then requires a change in the optical image magnification.

When the technique set forth in Patent Publication 1 is applied to the generation of a high-resolution image using image data having a reduced number of pixels, there is a problem that processing becomes complicated because, as mentioned just above, the change in the angle of view for implementing ultra-resolution processing requires a change in the optical image magnification.

In view of the above problems, an object of the present invention is to provide an imaging system that enables the size of the area to be imaged to be electronically changed without causing variations in the number of clocks per frame, and ultra-resolution processing to be applied to the area to be imaged.

DISCLOSURE OF THE INVENTION (1) According to the invention, the aforesaid object is achieved by the provision of an imaging system for electronically obtaining an image of a subject, characterized by comprising an optical image-formation means adapted to form the image of the subject on an imaging device, an imaging device capable of producing an image signal of a given area, an area setting portion adapted to set an output area from said imaging device, a means adapted to select a read rule for said imaging system depending on the size of an area set at said area setting portion, and a means adapted to generate a high-resolution image from image signals of multiple frames produced out of said imaging device.

Figure 1:
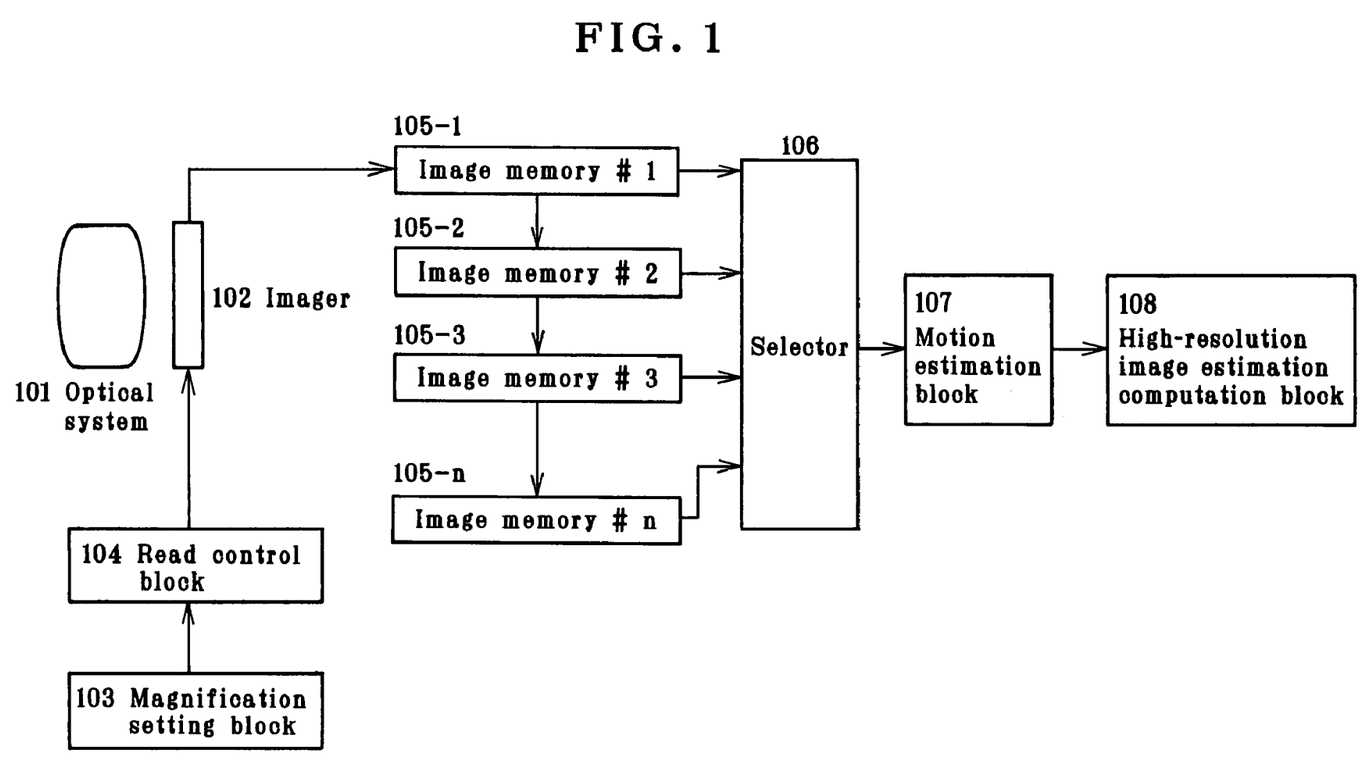
FIG. 1 is illustrative of the architecture of the first embodiment.

The invention (1) is equivalent to an embodiment shown in FIG. 1. The "optical image-formation means adapted to form the image of the subject on an imaging device" is equivalent to an optical system 101. The "imaging device capable of producing an image signal of a given area" is equivalent to an imager 102. The "area setting portion adapted to set an output area from said imaging device" is equivalent to a magnification address block 103. The "means adapted to select a read rule for said imaging device depending on the size of an area set at said area setting portion" is equivalent to a read control block 104. The "means adapted to generate a high-resolution from image signals of multiple frames produced out of the imaging device" is equivalent to a high-resolution image estimation block 108. According to the architecture of the invention (1), the size of the area is electronically changed, and ultra-resolution processing can be applied to the captured area.

(2) The aforesaid invention (1) is further characterized in that the read rule for said imaging device is such that irrespective of the size of said output area, the total number of clocks upon reading of pixels is constant. The invention (2) is equivalent to an embodiment of FIG. 2. The "the read rule for said imaging device being such that irrespective of the size of said output area, the total number of clocks upon reading of pixels is constant" is equivalent to processing wherein the "read/skip pattern is changed corresponding to the magnification addressed by a magnification address block 103. According to this architecture, while the number of clocks per frame is kept constant, the extent of the area to be read can be changed by the read control function of the imager.

(3) The aforesaid invention (2) is also characterized by further comprising a means adapted to make said read rule for the imaging device different for each frame. The invention (3) is equivalent to the embodiment of FIG. 2. The "means adapted to make the read rule for said imaging device different for each frame" is equivalent to "processing wherein the read rule is changed by the read control block 104 in a two-frame period of ODD (odd number) and EVEN (even number)". According to this architecture, image information is differed for each frame so that mutually missing information can be complemented.

(4) Further, the aforesaid invention (3) is further characterized in that the means adapted to generate a high-resolution image from said image signals of multiple frames comprises a means adapted to estimate a motion between multiple frames, a means adapted to use image signals of the multiple frames of which the motion is estimated to estimate a high-resolution image signal, and a means by which a mutual identical read rule is selected when said motion between multiple frames is estimated.

Figure 8:
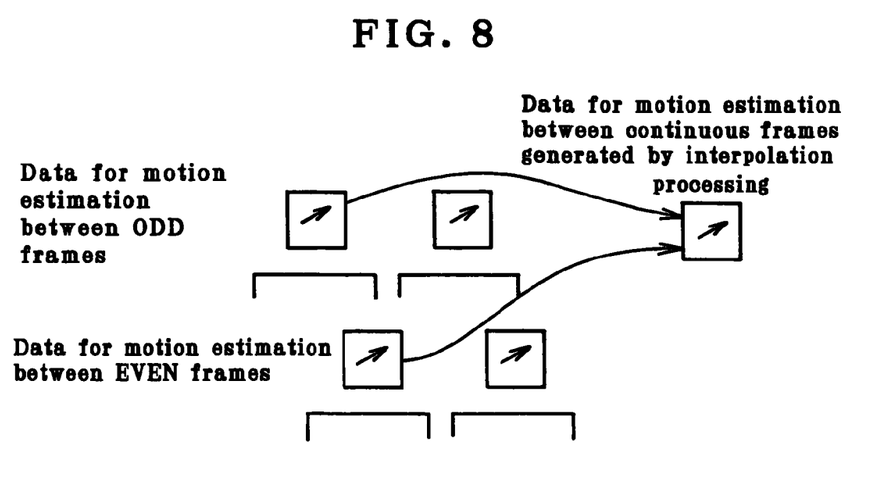
FIG. 8 is illustrative in conception of motion estimation between continuous frames.

The invention (4) is equivalent to an embodiment of FIG. 1 plus FIG. 8. The "means adapted to estimate a motion between multiple frames" is equivalent to a motion estimation block 107. The "means adapted to use image signals of the multiple frames of which the motion is estimated to estimate a high-resolution image signal" is equivalent to a high-resolution image estimation computation block 108. The motion estimation block 107 selects a frame in compliance with the same read rule for motion estimation, as shown in FIG. 8. According to the invention (4), motion estimation can be made depending on the characteristics of an image signal.

Figure 9:
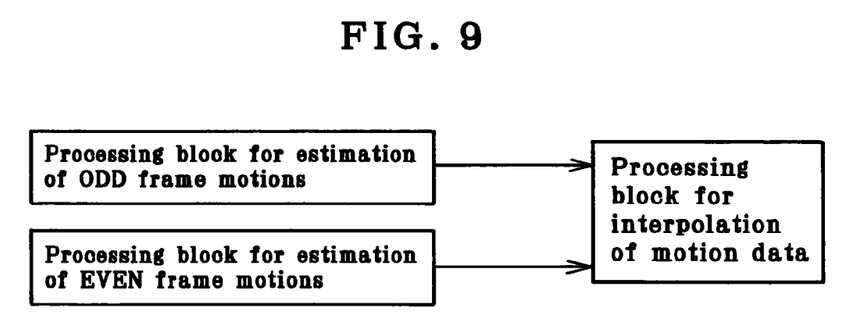
FIG. 9 is illustrative in conception of motion estimation between continuous frames.

(5) The aforesaid invention (4) is further characterized by comprising a means by which frames in compliance with the same read rule are selected for motion estimation when said motion estimation between multiple frames is implemented, wherein the means implements computation for estimation of a motion between continuous frames. The invention (5) is equivalent to an embodiment shown in FIG. 1 plus FIG. 9. The motion estimation block 107 is such that, as shown in FIG. 9, when said motion between multiple frames is estimated, a frame in compliance with the same read rule is selected for motion estimation, and computation for estimation of motion between continuous frames is implemented. According to the invention (5), the motion estimation can be implemented in various ways.

(6) The aforesaid invention (2) or (3) is further characterized in that the read rule for said imaging device is a cull read adapted to read pixels discretely. The invention (6) is equivalent to the embodiment of FIG. 2. The "read rule for said imaging device being a cull read adapted to read pixels discretely" is skip processing of FIG. 2. By implementing such cull read, the number of clocks can be kept constant, even upon the reading of pixels in a wide area exceeding the number of pixels produced.

(7) The aforesaid invention (6) is further characterized by comprising a means adapted to correct distortion due to cull read after cull read from said imaging device. The invention (7) is equivalent to an embodiment of FIG. 13. The "means adapted to correct distortion due to cull read after cull read of pixels from said imaging device" is equivalent to a distortion correction processing block 113. With this architecture, distortion of the image subjected to cull read is corrected, and a motion between continuous frames can be estimated, even with the use of the read rule different for each frame, as described with reference to (3) above.

(8) The aforesaid invention (7) is further characterized in that said distortion correction processing is pixel computation processing within the same frame. The invention (8) is equivalent to an embodiment of FIG. 11 plus FIG. 12. The "said distortion correction processing being pixel computation processing within the same frame" is equivalent to correction processing by linear interpolation factors k1, k2 in FIG. 12. According to this architecture, the correction processing for distortion can be simplified.

According to the imaging system of the invention, the size of the area to be imaged can be electronically changed with no fluctuation of the number of clocks per frame, and ultra-resolution processing can be applied to the area captured.

BEST MODE FOR CARRYING OUT THE INVENTION

Some embodiments of the invention are now explained with reference to the accompanying drawings. FIG. 1 is illustrative of the architecture of the first embodiment. In FIG. 1, an optical system 101 forms an optical image on an imager 102. Depending on the magnification addressed by a magnification address block 103, a read control block 104 selects a read rule for the imager. The read rule here means a rule for the read start position and cull read on the imager, as described later. In compliance with the read rule, the imager 102 transforms an optical image at an addressed area into electrical signals.

The read image signals are stored in n image memories 105-1 to 105-n, where n is the number of images needed for ultra-resolution processing. The ultra-resolution processing comprises a motion estimation block 107 and a high-resolution image estimation block 108 adapted to estimate image data having a high-resolution pixel sequence. A selector 106 selects a basic reference for motion estimation and an image that is estimated in terms of motion.

Figure 2A:
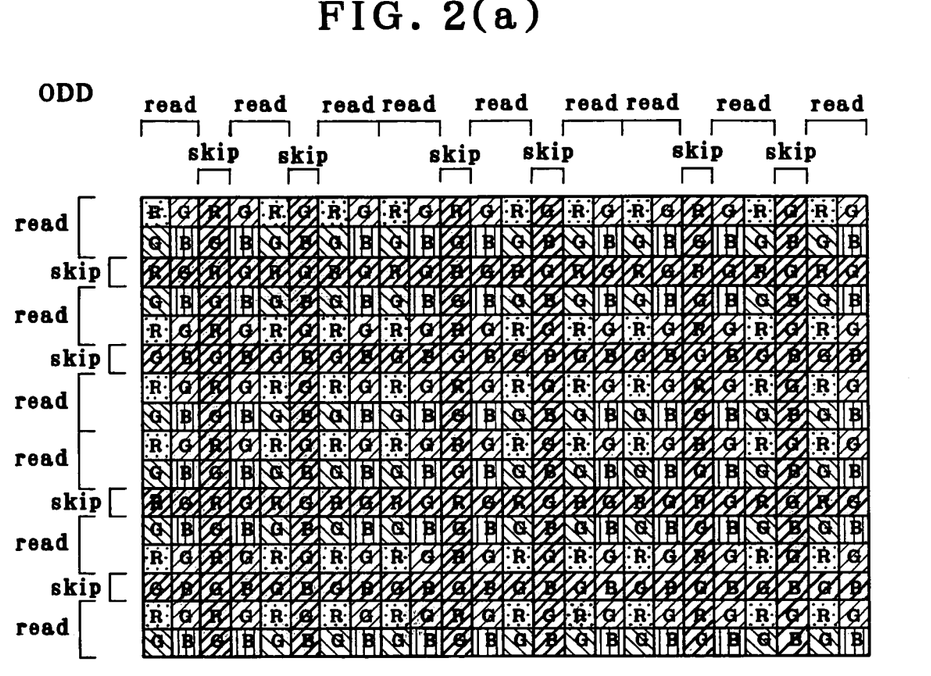
FIG. 2 is illustrative of an example of cull read.
Figure 2B:
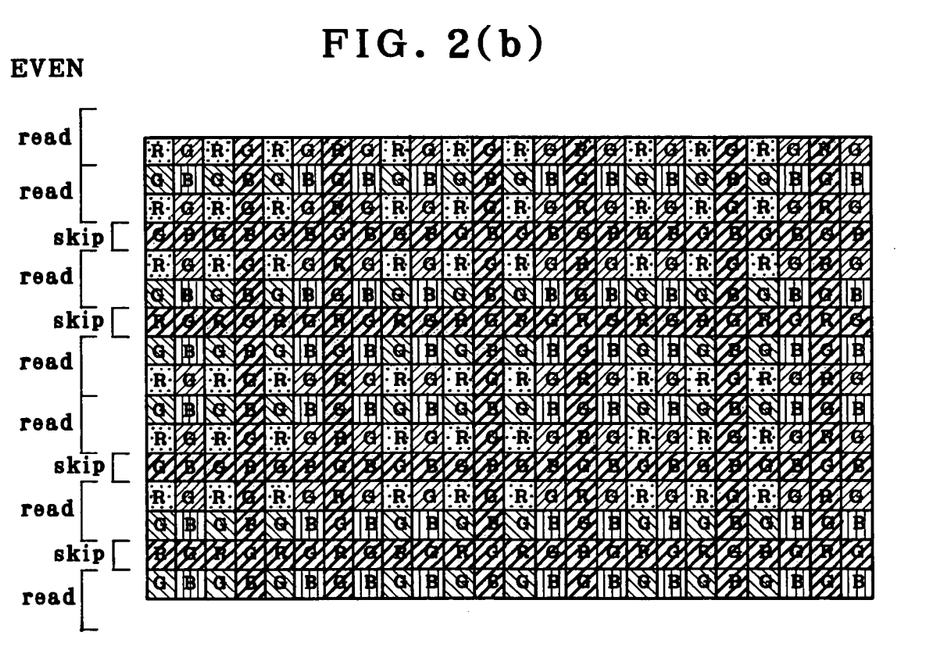

FIG. 2 is illustrative of an example of cull read that is a read rule selected at the read control block 104. In this example, reading is implemented over an area having an extent of 4/3 times and 4/3 times in the x and y directions with respect to the number of output pixels. A read control block of FIG. 1-104 has a function of making the read rule different for each frame. In FIG. 2, the read rule is changed in a two-frame period of ODD (odd number) and EVEN (even number).

Referring to pixels in the row direction with respect to ODD and EVEN, a sequence of RGRG . . . at the first row, a sequence of GBGB . . . at the second row, a sequence of RGRG . . . at the third row, a sequence of GBGB . . . at the fourth row and the like appear repeatedly. Referring to pixels in the column direction, a sequence of RGRG . . . at the first column, a sequence of GBGB . . . at the second column, a sequence of RGRG . . . at the third column, a sequence of GBGB . . . at the fourth row and the like appear repeatedly.

In FIG. 2, "read" is indicative of a position at which pixels are being read, and "skip" (a thick slant) is indicative of a position at which pixels are not read. At the "skip" position, there is no read clock generated. The read/skip pattern is changed in correspondence to the magnification addressed by the magnification address block 103. By implementing such reading, therefore, it is possible to change the read angle of view by virtue of the read control function of the imager, while the number of clocks per frame is kept control.

Figure 3:
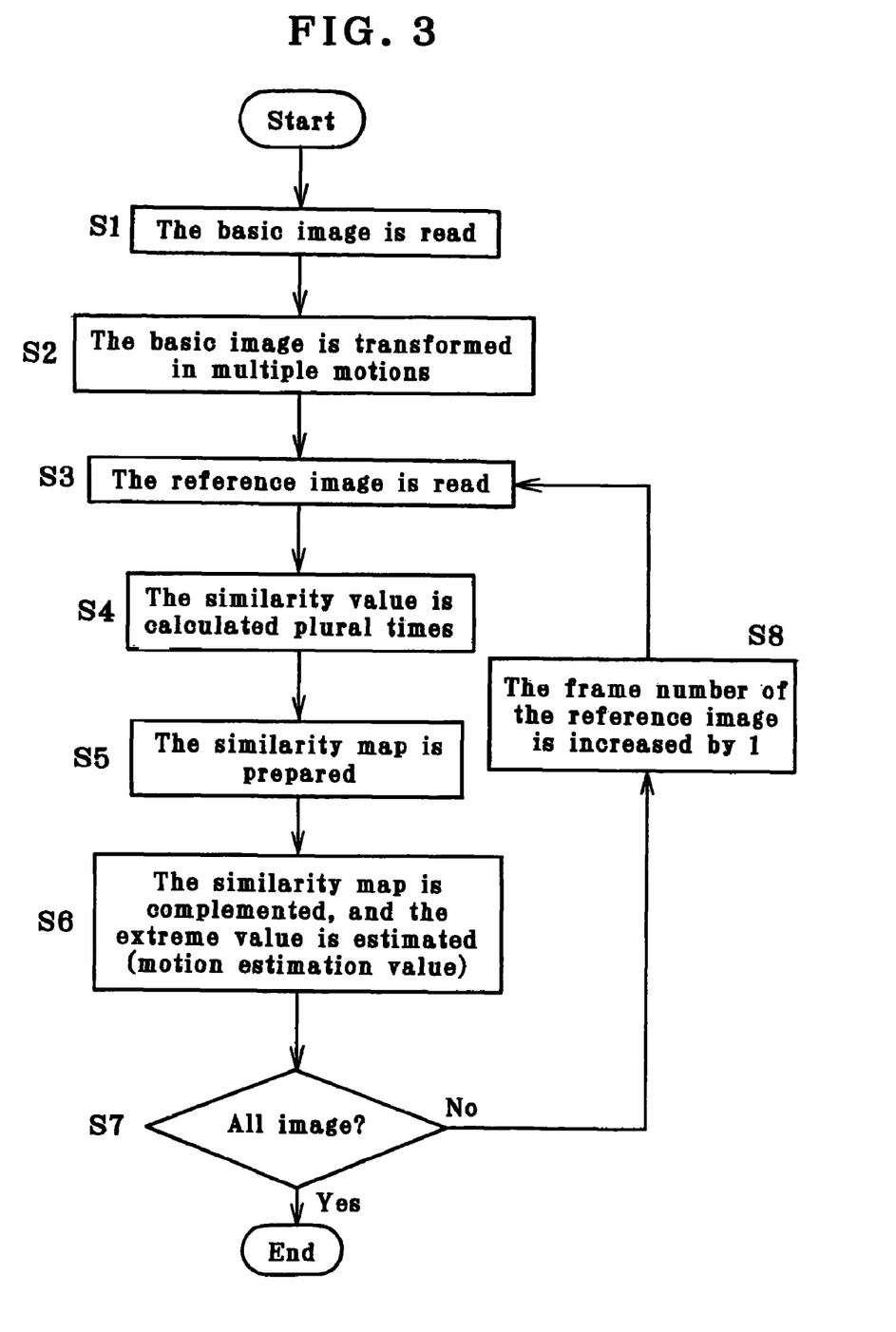
FIG. 3 is a flowchart for the motion estimation algorithm.

FIG. 3 is a flowchart indicative of the algorithm for motion estimation. Reference is now made to the algorithm of FIG. 3 along its flow. At S1, one image defining a basis for motion estimation is read. At S2, the basic image is transformed in multiple motions. At S3, one reference image is read to make motion estimation between the basic image and it. At S4, a similarity between a sequence of multiple transformed images and the reference image is calculated. At S5, a relation between a transformation motion parameter and the calculated similarity value is used to prepare a discrete similarity map.

At S6, the discrete similarity map prepared at S5 is complemented thereby searching and finding the extreme value for the similarity map. A transformation motion having that extreme value defines an estimation motion. For the purpose of searching the extreme value for the similarity map, there is parabola fitting, spline interpolation or the like. At S7, whether or not motion estimation has been made of all reference images of interest is determined. At S8, if not, the frame number of the reference image is increased by 1 to resume the processing of S3, keeping on the read processing of the next image. When motion estimation has been made of all reference images of interest, the processing comes to an end.

Figure 4:
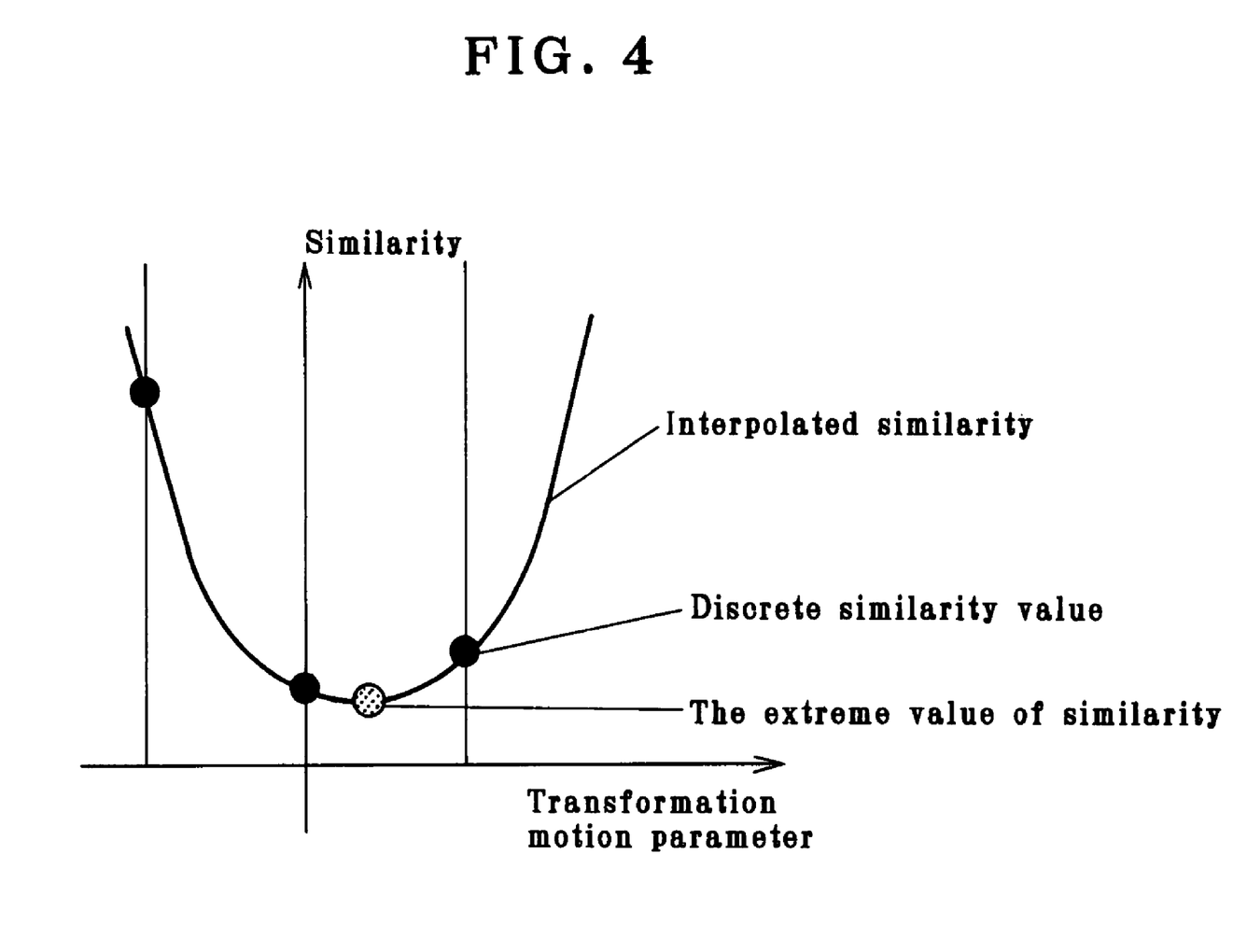
FIG. 4 is illustrative in conception of the estimation of the optimal similarity for motion estimation.

FIG. 4 is illustrative in conception of estimation of the optimal similarity for motion estimation implemented at the motion estimation block 107 described with reference to FIG. 1. FIG. 4 shows a one-dimensional optimal similarity for brevity; however, a two-dimensional optimal similarity could be estimated by a similar method, too. More specifically, FIG. 4 shows the results of using three black circles to implement motion estimation by parabola fitting. The ordinate is indicative of a similarity, and the abscissa is indicative of a transformation motion parameter. The smaller the value on the ordinate, the higher the similarity grows, and a gray circle where the value on the ordinate becomes smallest defines an extreme value for the similarity.

Figure 5:
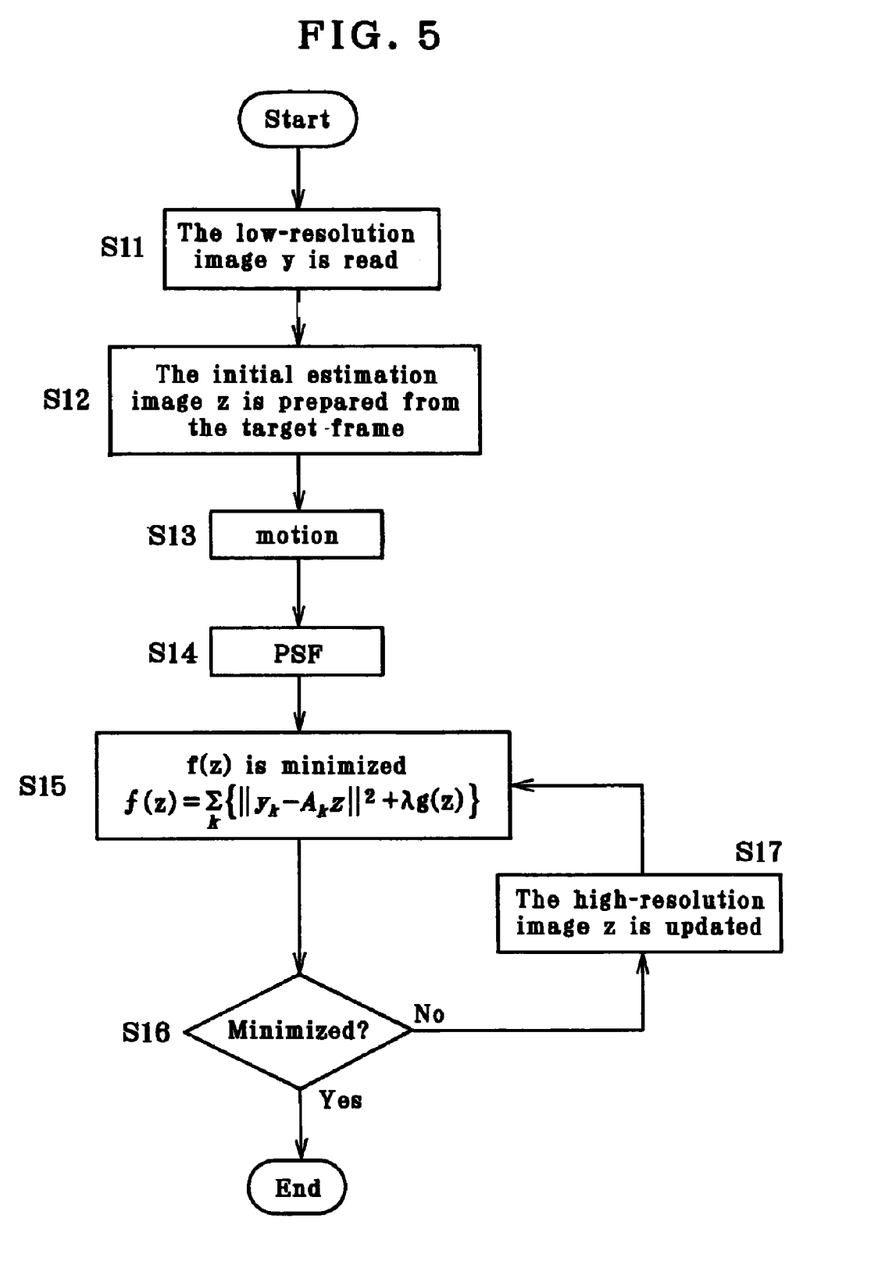
FIG. 5 is a flowchart for high-resolution image estimation.

FIG. 5 is a flowchart illustrative of the algorithm for an embodiment of high-resolution image estimation processing. At S11, multiple low-resolution images n used for high-resolution image estimation are read (n≧1). At S12, an initial high-resolution image is prepared by interpolation, assuming any one of multiple low-resolution images is the target frame. Optionally, this step may be dispensed with. At S13, an inter-image position relation is clarified by inter-image motion between the target frame determined in advance by some motion estimation technique and other frames. At S14, a point spread function (PSF) is found while bearing an optical transmission function (OTF), imaging characteristics such as CCD aperture or the like in mind. For instance, Gauss function is used for PSF. At S15, an estimation function f(z) is minimized on the basis of information at S3, S4. However, f(z) is represented by $$f(z) = \sum_k \{\|y_k - A_k z\|^2 + \lambda g(z)\} \quad (1)$$

Here, y is a low-resolution image, z is a high-resolution image, and A is an image transformation matrix indicative of an imaging system including an inter-image motion, PSF, etc.; g(z) includes a restraint term or the like, in which care is taken of image smoothness and color correlation; and λ is a weight coefficient. For the minimization of the estimation function, for instance, the steepest descent method is used. At S16, when f(z) found at S15 is already minimized, the processing comes to an end, giving the high-resolution image z. At S17, when f(z) is not yet minimized, the high-resolution image z is updated to resume the processing at S15.

Figure 6:
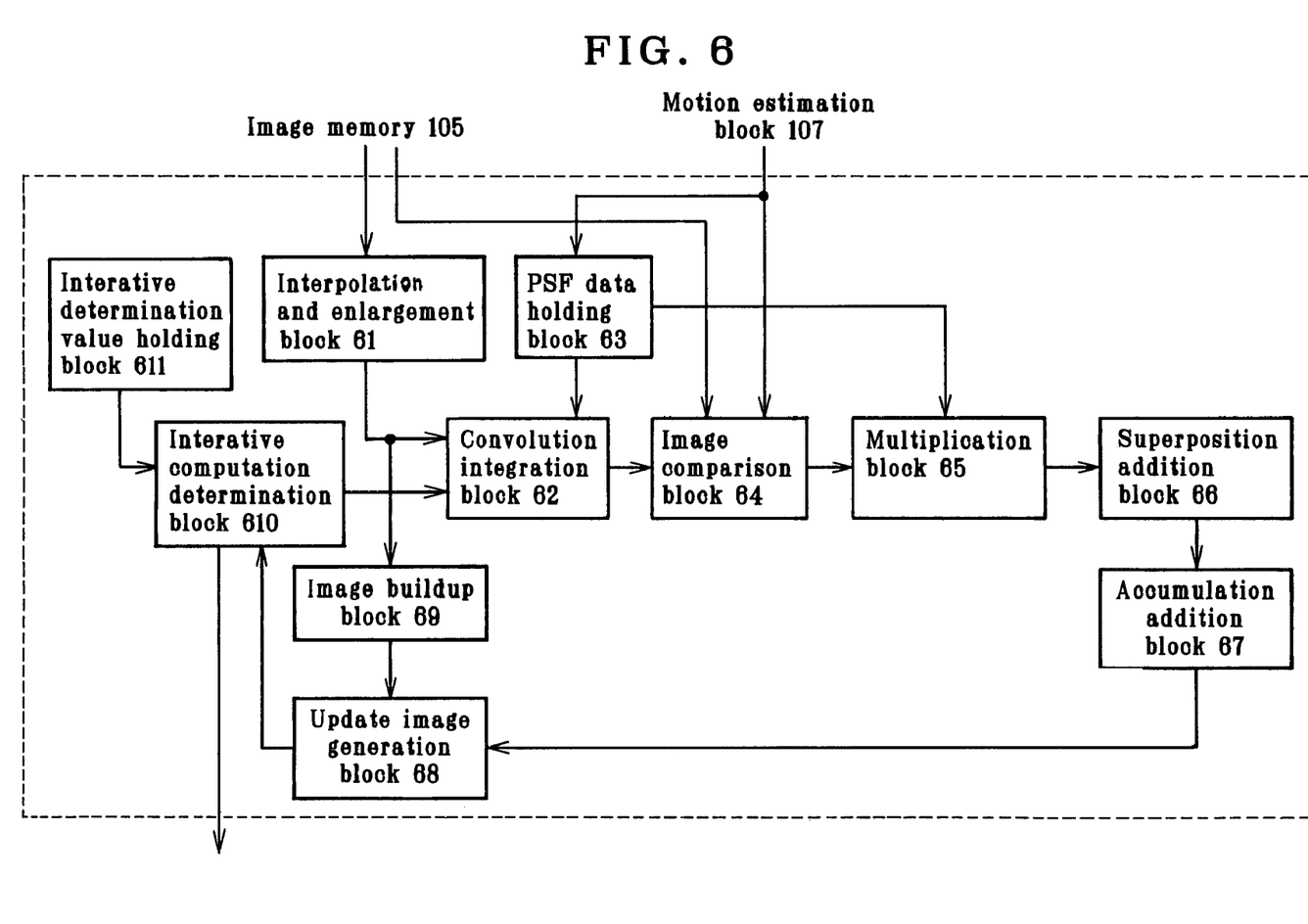
FIG. 6 is illustrative of the architecture of ultra-resolution processing.

FIG. 6 is illustrative of the architecture of ultra-resolution processing for running the aforesaid algorithm. In FIG. 6, a high-resolution image estimation computation block 108 is built up of an interpolation and enlargement block 61, a convolution integration block 62, a PSF data holding block 63, an image comparison block 64, a multiplication block 65, a superposition addition block 66, an accumulation addition block 67, an update image generation block 68, an image buildup block 69, an iterative computation determination block 610 and an iterative determination value holding block 611.

First, of image data as many as multiple frames recorded in the image memories 101-1 and 105-n, any one image that defines a basis is given to the interpolation and enlargement block 61 where the image is interpolated and enlarged. The interpolation and enlargement method used here, for instance, includes bilinear interpolation and bicubic interpolation. The interpolated and enlarged image is given to the convolution integration block 62, and subjected to convolution integration along with PSF data sent from the PSF data holding block 63. And of course, the motion of each frame is here taken into the image data. The interpolated and enlarged image data are at the same time sent to the image buildup block 69 for accumulation there.

Image data to which convolution computation is applied are sent to the image comparison block 64 where, on the basis of the motion of each frame found at the motion estimation block 107, they are compared at a proper coordinate position with taken images given out of the imaging block. The difference compared at the image comparison block 64 is forwarded to the multiplication block 65 for multiplication by the value per pixel of the PSF data given out of the PSF data holding block 63. The results of this computation are sent to the superposition addition block 66, where they are disposed at the corresponding coordinate positions. Referring here to the image data from the multiplication block 65, the coordinate positions displace little by little with overlaps, and so those overlaps are added on. As the superposition addition of one taken image of data comes to an end, the image data are forwarded to the accumulation addition block 67.

At the accumulation addition block 67, successively forwarded data are built up until the processing of data as many as frames gets done, and one each frame of image data are added on following the estimated motion. The added image data are forwarded to the update image generation block 68. At the same time, the image data built up at the image accumulation block 69 are given to the update image generation block 68, and two such image data are added with a weight to generate update image data.

The generated update image data are given to the iterative computation determination block 610 to judge whether or not the computation is to be repeated on the basis of the iterative determination value given out of the iterative determination value holding block 611. When the computation is repeated, the data are forwarded to the convolution integration block 62 to repeat the aforesaid series of processing, and when not, the generated image data are outputted. The motion for each frame is given from the motion estimation block 107 to the PSF data held at the aforesaid data holding block 63, because computation at a proper coordinate position becomes necessary for convolution integration.

The motion estimation for the image that is subjected to cull read as shown in FIG. 2 is carried out in the three following embodiments: (1) the motion is estimated between frames in compliance with the same read rule, but there is no interpolation of motion estimation between continuous frames; (2) the motion is estimated between frames in compliance with the same read rule, with interpolation of motion estimation between continuous frames; and image data missing within each frame are estimated, with estimation of motion between continuous frames.

With methods (1) and (2), reading is implemented in compliance with the same read rule at ODD and EVEN, respectively, as shown in FIG. 2, and the estimation of motion between these frames is carried out. For the motion estimation, image signals are obtained in such a reading way as shown in FIG. 2. Thereafter, the image signals are stored in the image memory, and the motion estimation is carried out while care is taken of skip positions. That is, constraint conditions are imposed on the estimation of motion in consideration of a case where the image of the subject is caught at a skipped position between two frames, and a case where what is in the position skipped at the previous frame emerges.

Figure 7:
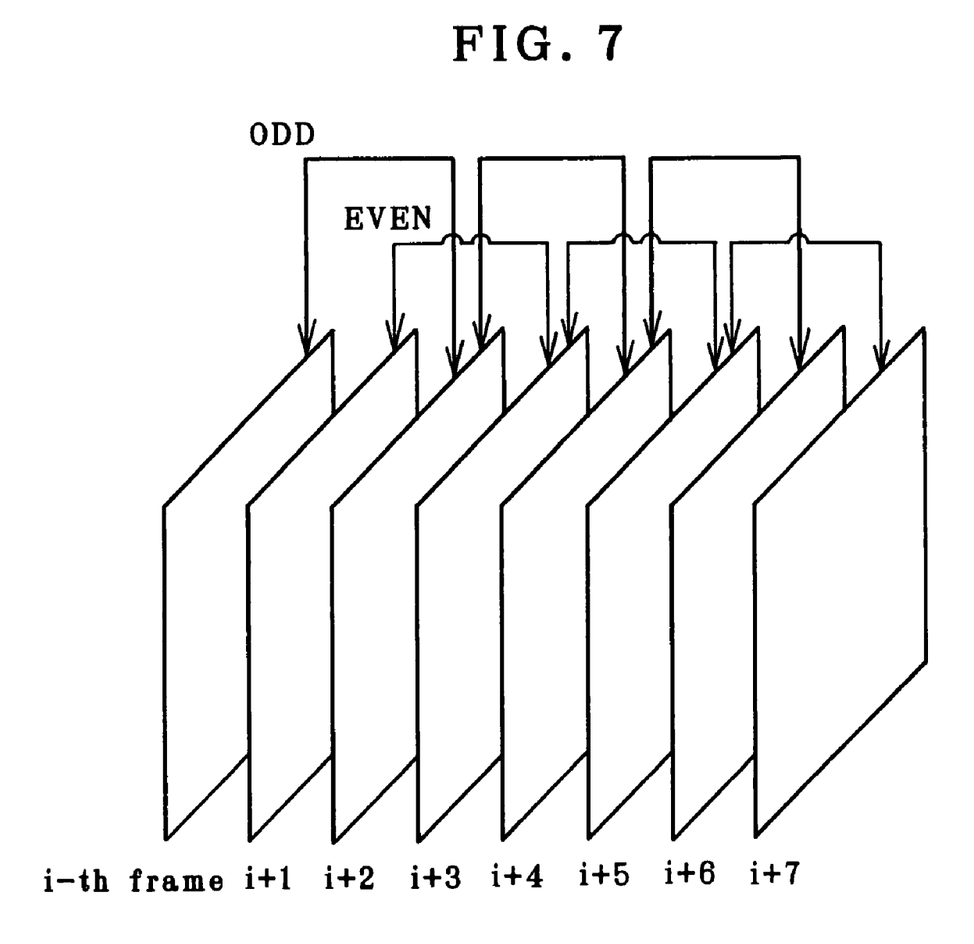
FIG. 7 is illustrative in conception of motion estimation with respect to cull read.

FIG. 7 is illustrative in conception of motion estimation for cull reading. As shown in FIG. 7, in the case (1), the estimation of a high-resolution image is implemented only at the ODD and EVEN frame rows, respectively. FIG. 8 is illustrative in conception of motion estimation for continuous frames. As shown in FIG. 8, in the case (2), the motion estimation for continuous frame is implemented after the estimation of motion at the respective ODD, EVEN frame rows. The estimation of motion for continuous frames, for instance, could be implemented by interpolation processing by averaging processing. For instance, motion a for I-th frame, I+2-th frame, and motion a' for I+1-th, I+3-th are each found as a vector, a motion of size half of a is subtracted from the I+2-th frame to figure out a candid value for a motion between I+1 and I+2. An addition average of this and the motion of size half of a' is worked out as the estimation value of motion for continuous frames by means of average value processing.

FIG. 9 is illustrative in conception of motion estimation of continuous frames. As shown in FIG. 9, in the case (3), image signal data of continuous frames are interpolated within the respective frames for association with inter-frame data. Thus, contrary to the read rule in the example of FIG. 2, the processing for correction of image distortion induced by cull reading is called the distortion correction processing.

Figure 10:
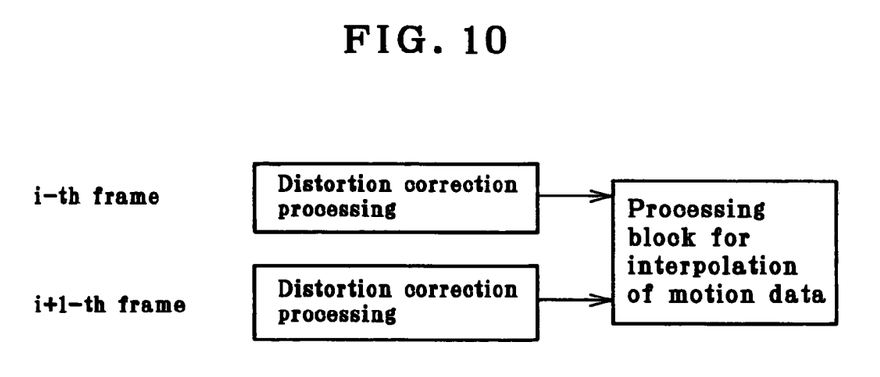
FIG. 10 is illustrative in conception of the estimation of a motion between continuous frames after intra-frame interpolation (distortion correction) processing.

FIG. 10 is illustrative in conception of the motion estimation of continuous frames after intra-frame interpolation (distortion correction). In FIG. 10, distortion is corrected for an i-th frame and an i+1-th frame, respectively, and the motion estimation of continuous frames is then implemented at a motion data correction block. That is, there is an embodiment including distortion correction processing shown in the example of FIG. 10.

FIG. 11 is illustrative in conception of distortion correction processing. The details of distortion correction processing are now explained with reference to FIG. 11. In the example of FIG. 11, of 8 pixels R0 to G7 in the horizontal direction of an R-G line in a Bayer sequence, two pixels G3 and G6 are skipped over to read image data, and from the read image data there is an R-G-R-G . . . generated at an equal space. That is, (1) the value of estimation of missing pixel data is calculated from the read image data to obtain 8-pixel data, and (2) reduction processing is carried out to generate 6-pixel data from 8 pixels.

Figure 11A:
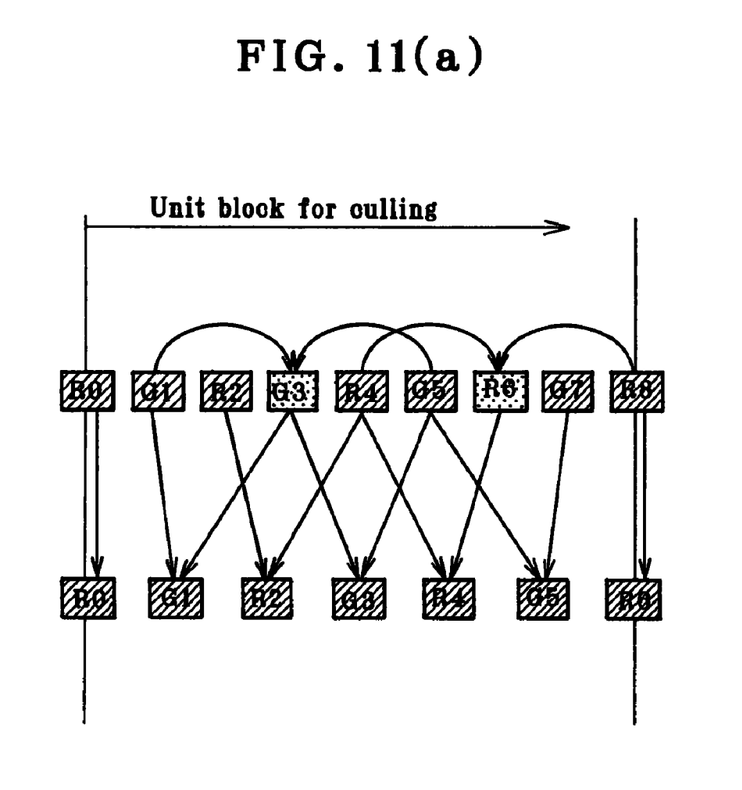
FIG. 11 is illustrative in conception of distortion correction processing.
Figure 11B:
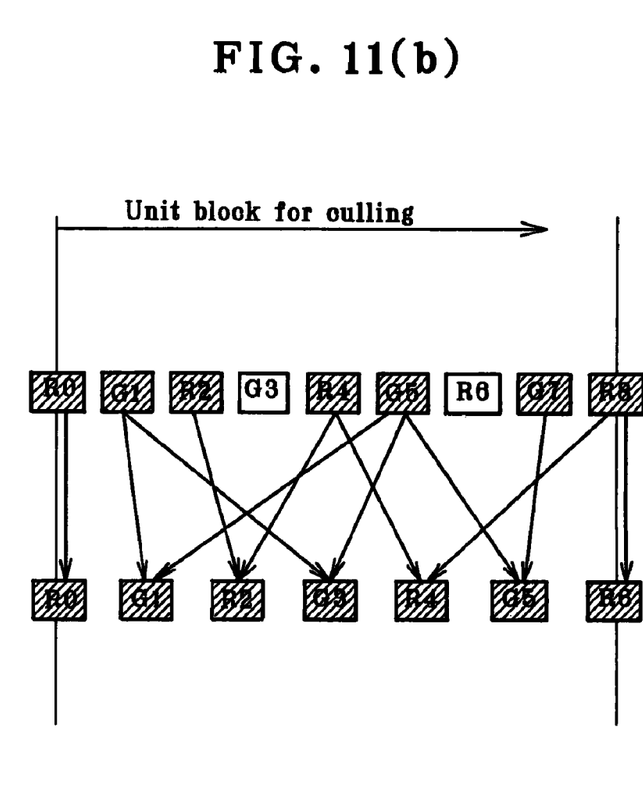

The estimation of the values of missing pixels here could be made by either such two-stage processing of interpolation and reduction as shown in FIG. 11(a) or such one single interpolation processing as shown in FIG. 11(b). This is represented by such linear transformation as represented by formula (3), given later. On the other hand, primary or cubic interpolation could be used for reduction processing, as described later. Cubic interpolation, too, could be simplified into one single linear transformation, as is the case with FIG. 11(b) or formula (3). In cull read processing or distortion correction processing, if 6 pixels are read out of 8 pixels, it would then become a 75% reduction processing. Alternatively, if 8 pixels are read out of 10 pixels, it would then become an 80% reduction processing, or if 10 pixels are read out of 12 pixels, it would then become an 83% reduction processing.

Formula (2) given below represents in a matrix form a method of filling up the missing pixels by virtue of linear interpolation and using linear interpolation as a size change.

$$\begin{bmatrix} \overline{R_0} \\ \overline{G_1} \\ \overline{R_2} \\ \overline{G_3} \\ \overline{R_4} \\ \overline{G_5} \end{bmatrix} \begin{bmatrix} 1 & & & & & \\ & 5/6 & 0 & 1/6 & & \\ & & 4/6 & 0 & 2/6 & \\ & & & 3/6 & 0 & 3/6 \\ & & & & 2/6 & 0 & 4/6 \\ & & & & & 1/6 & 0 & 5/6 \end{bmatrix} \quad (2)$$

$$\begin{bmatrix} 1 & & & & & & & \\ & 1 & & & & & & \\ & & 1 & & & & & \\ & 1/2 & 0 & 0 & 1/2 & & & \\ & & & & 1 & & & \\ & & & & & 1 & & \\ & & 1/2 & 0 & 0 & 1/2 & & \\ & & & & & & & 1 \end{bmatrix} \begin{bmatrix} R_0 \\ G_1 \\ R_2 \\ R_4 \\ G_5 \\ G_7 \\ R_0^+ \end{bmatrix}$$

In the operation at the second term on the right side of formula (2), image data sampled like R(i), G(i+1), R(i+2), R(i+4), G(i+5), G(i+7), R(i+8) . . . are interpolated to generate R(i), G(i+1), R(i+2), G⁻(I+3), R(i+4), G(i+5), R⁻(i+8), G(i+7) . . . , and in the operation at the first term on the right side, transformation of 8 pixels into 6 pixels is implemented by linear interpolation.

These operations are combined into such linear transformation as represented by formula (3), given just below.

$$\begin{bmatrix} \overline{R_0} \\ \overline{G_1} \\ \overline{R_2} \\ \overline{G_3} \\ \overline{R_4} \\ \overline{G_5} \end{bmatrix} = \begin{bmatrix} 1 & & & & & & \\ & 11/12 & 0 & 0 & 1/12 & & \\ & & 4/6 & 2/6 & & & \\ & 3/12 & 0 & 0 & 9/12 & & \\ & & & & 4/6 & 0 & 0 & 2/6 \\ & & & & & 1/6 & 5/6 & \end{bmatrix} \begin{bmatrix} R_0 \\ G_1 \\ R_2 \\ R_4 \\ G_5 \\ G_7 \\ R_0^+ \end{bmatrix} \quad (3)$$

Figure 12:
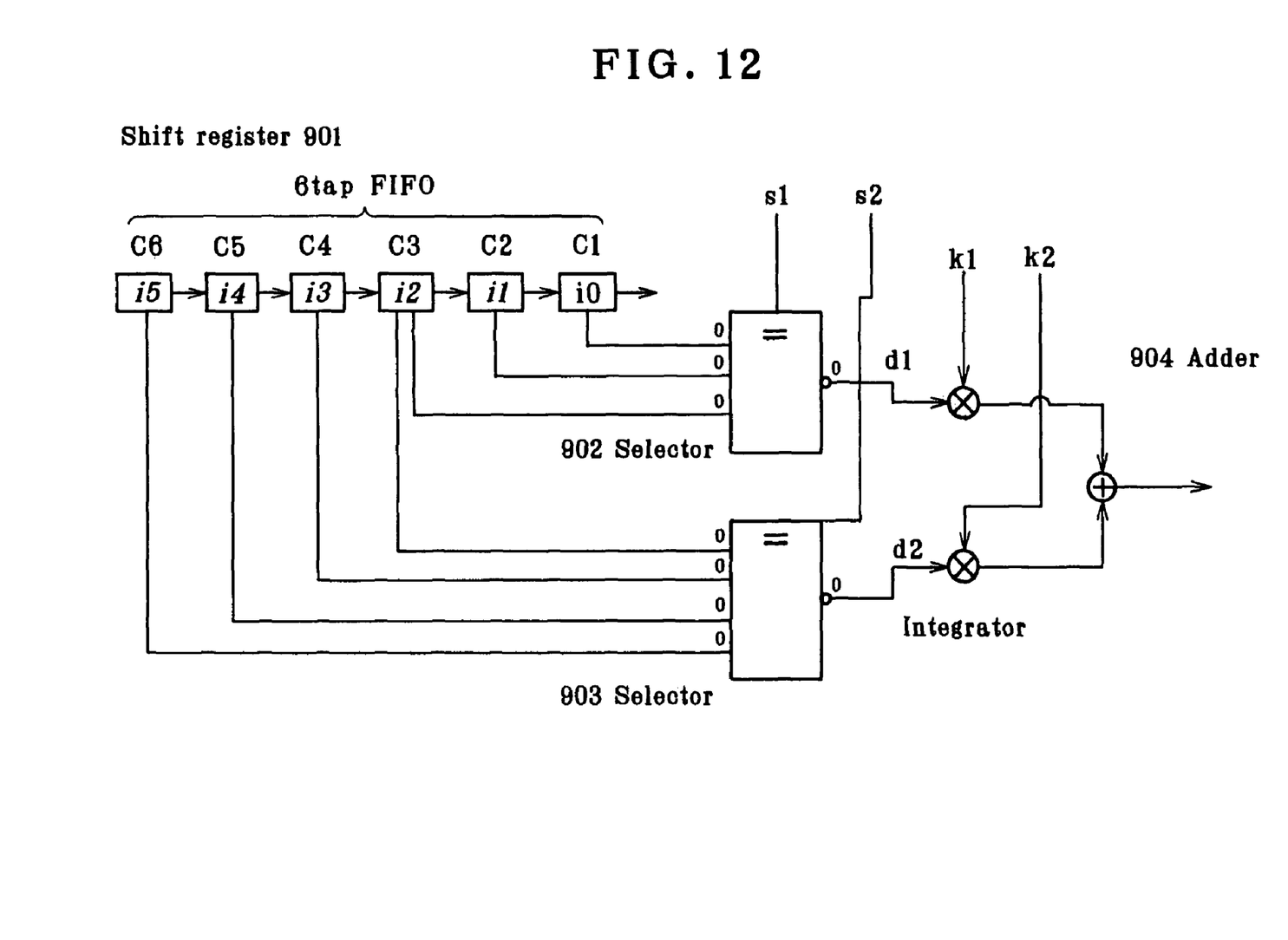
FIG. 12 is illustrative in conception of the filter arrangement for distortion correction processing.

FIG. 12 is illustrative of the architecture of the filter for distortion correction processing. As shown in FIG. 12, this operation is executed in the form of pipeline processing. In FIG. 12, a shift register 901 takes the form of a 6-tap FIFO wherein there is a shift for each pixel. Reference numerals i0 to i5 represent shift registers in which pixel data are to be entered, and s1 and s2 represent the signals of the selector. Four values of −1, 0, 1 and 2 are included in s1 and s2. There is no limit to the range of values except for 4 values. Reference numerals d1 and d2 stand for the outputs of selectors 902 and 903, and k1 and k2 stand for parameters for linear interpolation; the output value of an adder 904 becomes k1·d1+ k2·d2. Table 1 is a logic table for computation for each pixel clock in the architecture of FIG. 12.

TABLE 1

| C1 | C2 | C3 | C4 | C5 | C6 | C7 | s1 | s2 | d1 | d2 | k1 | k2 | out |
|----|----|----|----|----|----|----|----|----|----|----|----|----|-----|
| i2− | i1− | i0 | i1 | i2 | i3 | i4 | 1 | 1 | i0 | i2 | 1 | 0 | 1 * i0 + 0 * i2 |
| i1− | i0 | i1 | i2 | i3 | i4 | i5 | 1 | 2 | i1 | i4 | 11/12 | 1/12 | 11/12 * i1 + 1/12 * i4 |
| i0 | i1 | i2 | i3 | i4 | i5 | i6 | 1 | 0 | i2 | i3 | 4/6 | 2/6 | 4/6 * i2 + 2/6 * i3 |
| i1 | i2 | i3 | i4 | i5 | i6 | i7 | −1 | 0 | i1 | i4 | 1/4 | 3/4 | 1/4 * i1 + 3/4 * i4 |
| i2 | i3 | i4 | i5 | i6 | i7 | i8 | 0 | 1 | i3 | i6 | 4/6 | 2/6 | 4/6 * i3 + 2/6 * i6 |
| i3 | i4 | i5 | i6 | i7 | i8 | i9 | 0 | −1 | i4 | i5 | 1/6 | 5/6 | 1/6 * i4 + 5/6 * i5 |
| i4 | i5 | i6 | i7 | i8 | i9 | i10 | 1 | 1 | i6 | i8 | 1 | 0 | 1 * i6 + 0 * i8 |
| i5 | i6 | i7 | i8 | i9 | i10 | i11 | 1 | 2 | i7 | i10 | 11/12 | 1/12 | 11/12 * i7 + 1/12 * i10 |
| i6 | i7 | i8 | i9 | i10 | i11 | i12 | 1 | 0 | i8 | i9 | 4/6 | 2/6 | 4/6 * i8 + 2/6 * i9 |
| i7 | i8 | i9 | i10 | i11 | i12 | i13 | −1 | 0 | i7 | i10 | 1/4 | 3/4 | 1/4 * i7 + 3/4 * i10 |
| i8 | i9 | i10 | i11 | i12 | i13 | i14 | 0 | 1 | i9 | i12 | 4/6 | 2/6 | 4/6 * i9 + 2/6 * i12 |
| i9 | i10 | i11 | i12 | i13 | i14 | i15 | 0 | −1 | i10 | i11 | 1/6 | 5/6 | 1/6 * i10 + 5/6 * i11 |

The logic table 1 shows the state of one pixel clock in the row direction, wherein there is a pixel data shift like C1<=C2<=C3.

For the estimation of the luminance level of missing pixels, use could be made of not only such primary interpolation at the same channel as described above, cubic interpolation at the same channel and linear interpolation like a sinc function but also an interpolation method using correlations between R, G and B channels.

The value of estimation of the luminance level of missing pixels is given by formula (4) or (5), mentioned just below.

$$R_i = \frac{1}{2}\left(G_{i-1}\left(\frac{2R_{i-2}}{G_{i-3}+G_{i-1}}\right)+G_{i+1}\left(\frac{2R_{i+2}}{G_{i+3}+G_{i+1}}\right)\right) \quad (4)$$

$$G_i = \frac{1}{2}\left(R_{i-1}\left(\frac{2G_{i-2}}{R_{i-3}+R_{i-1}}\right)+R_{i+1}\left(\frac{2G_{i+2}}{R_{i+3}+R_{i+1}}\right)\right) \quad (5)$$

After such discrete reading as shown in FIG. 2, the estimation of missing pixels is made from formula (4) or (5) so that there can be motions estimated between adjoining frames differing in the reading mode.

Figure 13:
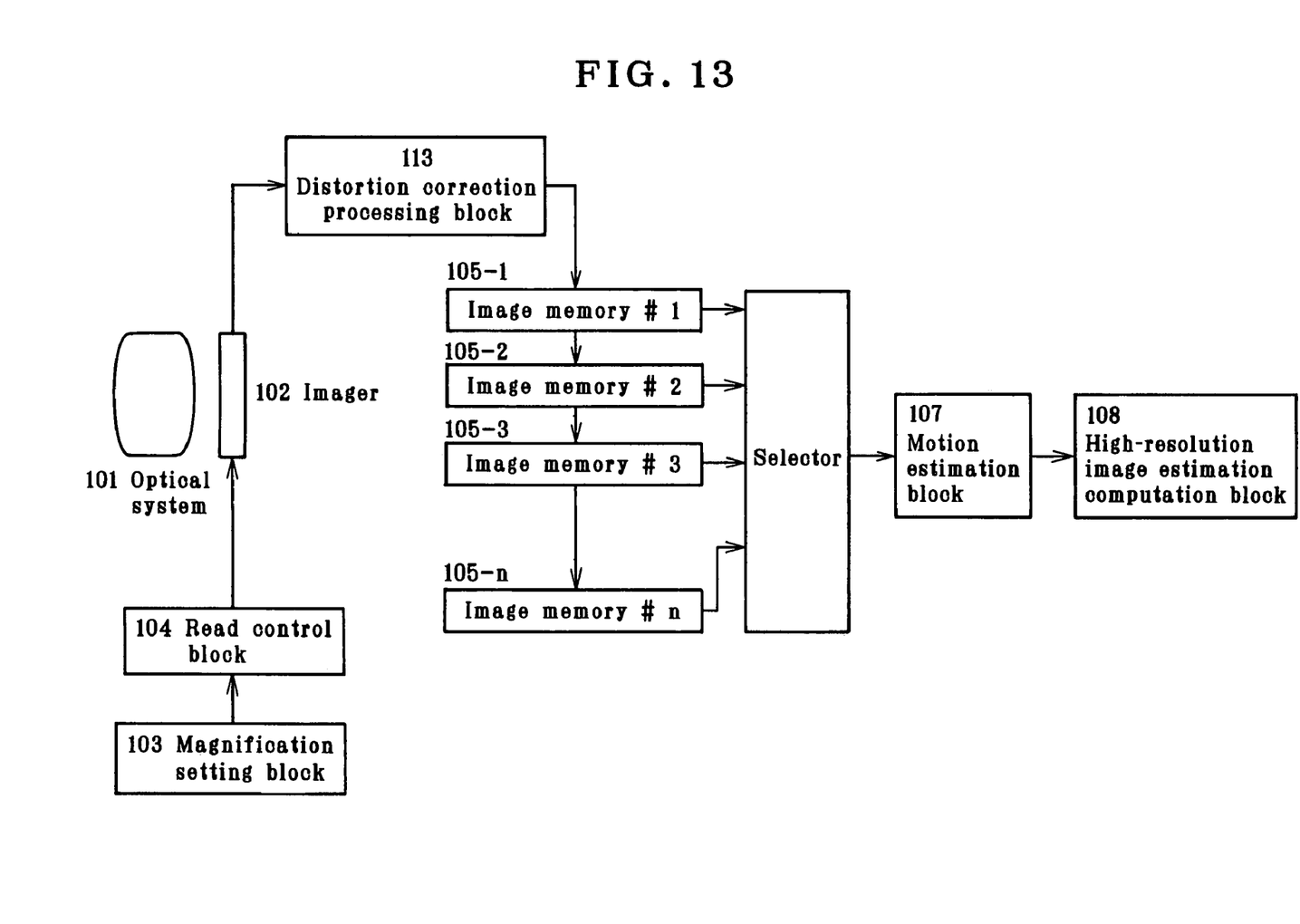
FIG. 13 is illustrative in conception of an embodiment including a distortion correction processing block.

FIG. 13 is illustrative of the architecture of an embodiment comprising such a distortion correction means (distortion correction processing block 113) as described above. Image data for which distortion has been corrected are held in image memories 105-1 to 105-n, after which motions are estimated between frames to obtain an estimated high-resolution image at a high-resolution image estimation computation block 108 the architecture of which is shown in FIG. 6.

POSSIBLE APPLICATIONS TO THE INDUSTRY

The invention as described above can provide an imaging system in which the size of the area to be imaged can be electronically changed with no fluctuation of the number of clocks per frame, and ultra-resolution processing can be applied to the area captured.

What we claim is:

1. An imaging system comprising:
    an optical system adapted to form images on an imaging device, wherein said imaging device is capable of producing image signals of multiple frames, said image signals of multiple frames being read out of partial areas of said images on said imaging device;
    a read control portion adapted to select a read rule for said imaging device depending on sizes of said partial areas of said images on said imaging device, wherein a read start position is determined in accordance with the read rule;
    a portion adapted to generate a high-resolution image from said image signals of said multiple frames produced by said imaging device; and
    a portion adapted to make the read rule for said imaging device different for each frame;
    wherein the read rule for said imaging device is such that irrespective of said sizes of the partial areas, a total number of clocks upon reading of pixels is constant.

2. The imaging system according to claim 1, wherein the portion adapted to generate a high-resolution image from said image signals of said multiple frames comprises:
    a portion adapted to estimate a motion between multiple frames; a portion adapted to use image signals of the multiple frames of which the motion is estimated to estimate a high-resolution image signal; and
    a portion by which a mutual identical read rule is selected when said motion between multiple frames is estimated.

3. The imaging system according to claim 2, further comprising a portion by which frames in compliance with the same read rule are selected for motion estimation when said motion estimation between multiple frames is implemented, wherein said portion implements computation for estimation of a motion between continuous frames.

4. The imaging system according to claim 3, wherein the read rule for said imaging device is a cull read adapted to read pixels discretely.

5. The imaging system according to claim 4, further comprising a portion adapted to correct distortion due to the cull read after the cull read is performed.

6. The imaging system according to claim 5, wherein said distortion correction processing is pixel computation processing within the same frame.

7. The imaging system according to claim 2, wherein the read rule for said imaging device is a cull read adapted to read pixels discretely.

8. The imaging system according to claim 7, further comprising a portion adapted to correct distortion due to the cull read after the cull read is performed.

9. The imaging system according to claim 8, wherein said distortion correction processing is pixel computation processing within the same frame.

* * * * *